(12) United States Patent
Levant et al.

(10) Patent No.: US 12,214,601 B2
(45) Date of Patent: Feb. 4, 2025

(54) DETECTING A DEFECTIVE NOZZLE IN A DIGITAL PRINTING SYSTEM

(71) Applicant: LANDA CORPORATION LTD., Rehovot (IL)

(72) Inventors: Boris Levant, Rehovot (IL); Shai Silberstein, Nes Ziona (IL); Tomer Yanir, Mazkeret Batya (IL); Avraham Guttman, Yavne (IL); Alon Siman Tov, Or Yehuda (IL)

(73) Assignee: Landa Corporation Ltd., Rehovot (IL)

( * ) Notice: Subject to any disclaimer, the term of this patent is extended or adjusted under 35 U.S.C. 154(b) by 225 days.

(21) Appl. No.: 17/921,359

(22) PCT Filed: May 12, 2021

(86) PCT No.: PCT/IB2021/054037
§ 371 (c)(1),
(2) Date: Oct. 26, 2022

(87) PCT Pub. No.: WO2021/234509
PCT Pub. Date: Nov. 25, 2021

(65) Prior Publication Data
US 2023/0264483 A1   Aug. 24, 2023

Related U.S. Application Data

(60) Provisional application No. 63/026,054, filed on May 17, 2020.

(51) Int. Cl.
*B41J 2/21* (2006.01)
*G06N 3/0464* (2023.01)
*G06T 7/00* (2017.01)

(52) U.S. Cl.
CPC .......... *B41J 2/2142* (2013.01); *G06N 3/0464* (2023.01); *G06T 7/0004* (2013.01);
(Continued)

(58) Field of Classification Search
CPC .... B41J 2/2142; B41J 2/2146; B41J 2/04505; B41J 2/04506; B41J 2/0451;
(Continued)

(56) References Cited

U.S. PATENT DOCUMENTS 5,109,275 A   4/1992   Naka et al.
6,575,549 B1  6/2003   Silverbrook et al.
(Continued)

FOREIGN PATENT DOCUMENTS

DE   102019208149 A1   1/2020
WO   2015029789 A1     3/2015
WO   2019193900 A1     10/2019

OTHER PUBLICATIONS

DE102019208149A1 Machine Translation (by EPO and Google)—published Jan. 9, 2020; Heidelberger Druckmasch AG [DE].
(Continued)

*Primary Examiner* — Kristal Feggins
(74) *Attorney, Agent, or Firm* — Meitar Patents Ltd.; Daniel Kligler (57) ABSTRACT

A method includes, receiving a first digital image (FDI) to-be printed by a digital printing system (DPS) (10). In a in training phase: for first selected regions (111) in the FDI, a first set of synthetic images (SIs) (112A, 112B, 114A, 114B, 116A, 116B) having a defect caused by a defective part (DP) (99) in the first selected regions, is produced; a neural network (NN) (150) is trained to detect the defect using the first set SIs. In a subsequent detection phase: the NN is applied for identifying, in a second digital image (SDI) (136, 146) acquired from an image produced by the DPS, suspected second regions (135, 145); for each of the second regions, a second set (137, 147) of SIs having DPs that form
(Continued)

the defects, is produced; and the DP is identified by comparing, in each of the second regions, between the SDI and the second set SIs.

12 Claims, 6 Drawing Sheets

(52) U.S. Cl.
CPC ............... *G06T 2207/20081* (2013.01); *G06T 2207/20084* (2013.01)

(58) Field of Classification Search
CPC .......................... B41J 2/04513; B41J 2/04515; B41J 2/04526; B41J 2/04535; B41J 2/165; B41J 2/16517; B41J 2/16579; B41J 2/2135; B41J 2/2139; B41J 2/512; B41J 19/145; B41J 2002/1657; B41J 2002/16573; G06N 3/0464; G06N 3/045; G06N 3/08; G06T 7/0004; G06T 2207/20081; G06T 2207/20084
See application file for complete search history.

(56) References Cited

U.S. PATENT DOCUMENTS

| | | | |
|---|---|---|---|
| 7,289,248 | B2 | 10/2007 | Yamazaki |
| 8,411,326 | B2 | 4/2013 | Inoue et al. |
| 8,496,313 | B2 | 7/2013 | Ueshima et al. |
| 8,646,862 | B2 | 2/2014 | Wu et al. |
| 8,646,869 | B2 | 2/2014 | Yamazaki et al. |
| 8,740,339 | B2 | 6/2014 | Yamazaki et al. |
| 9,218,645 | B2 | 12/2015 | Shibata et al. |
| 10,507,647 | B1 | 12/2019 | Tal |
| 2004/0189556 | A1 | 9/2004 | Tsujino et al. |
| 2004/0223014 | A1 | 11/2004 | Barr et al. |
| 2005/0083361 | A1 | 4/2005 | Nakanishi et al. |
| 2015/0258807 | A1 | 9/2015 | Sudo et al. |
| 2015/0360491 | A1 | 12/2015 | Billow et al. |
| 2019/0057499 | A1 | 2/2019 | Dekel-Klein et al. |
| 2019/0105895 | A1 | 4/2019 | Muehl et al. |
| 2019/0134990 | A1 | 5/2019 | Siman-Tov et al. |
| 2019/0248153 | A1 | 8/2019 | Muehl et al. |
| 2019/0291461 | A1 | 9/2019 | Neeb et al. |

OTHER PUBLICATIONS

WO2015029789 Machine Translation (by EPO and Google)—published Mar. 5, 2015, Fujifilm Corp.

DETECTING A DEFECTIVE NOZZLE IN A DIGITAL PRINTING SYSTEM

CROSS-REFERENCE TO RELATED APPLICATIONS

This application is U. S. National Phase of PCT Application PCT/IB2021/054037, filed May 12, 2021, which claims the benefit of U.S. Provisional Patent Application 63/026,054, filed May 17, 2020. The disclosures of these related applications are incorporated herein by reference.

FIELD OF THE INVENTION

The present invention relates generally to digital printing, and particularly to methods and systems for detecting a defective nozzle in a digital printing system.

BACKGROUND OF THE INVENTION

Various methods and systems for correcting distortions by identifying defective parts in a printing system are known in the art.

For example, U.S. Patent Application Publication 2019/0248153 describes a method for detecting defective printing nozzles in an inkjet printing machine includes printing a multi-row printing nozzle test chart formed of horizontal rows of equidistant vertical lines periodically underneath one another, with only printing nozzles in a print head contributing to every row of the test chart corresponding to the horizontal rows. An area coverage element geometrically associated with the test chart is printed, both elements are recorded by an image sensor and analyzed by the computer. The computer analyzes the recorded area coverage element to detect print defects and allocates defects to a region of geometrically close printing nozzles. An analysis of the test chart in the region identifies nozzles causing the defect. Defective printing nozzles are detected based on thresholds, the detected printing nozzles are then compensated, and in the analysis of the recorded area coverage element, influences of the sensor are eliminated by shading correction.

U.S. Pat. No. 5,109,275 describes an apparatus for printing signal correction and printer operation control, for use in applications such as color copiers, utilizes a neural network to convert input image signals, derived for example by scanning and analyzing an original image, into printing density signals which are supplied to a printer. In addition, a detection signal expressing at least one internal environmental condition of the printer, such as temperature, is inputted to the neural network, so that the output printing density signals are automatically compensated for changes in internal environment of the printer.

U.S. Patent Application Publication 2019/0105895 describes a method that detects defective printing nozzles in an inkjet printing machine having a computer. The method includes printing a multi-row nozzle test chart for detection purposes, the test chart contains a number of horizontal rows of equidistant vertical lines printed periodically and disposed underneath one another. Wherein in every row of the nozzle test chart periodically only those respective printing nozzles of the print head contribute to the first element of the nozzle test chart that correspond to the specified number of the horizontal rows. An area coverage element geometrically associated with the nozzle test chart is printed. Both elements are recorded by an image sensor and both elements are evaluated by the computer. Defective printing nozzles are identified by evaluating the recorded nozzle test chart by the computer. Defects are allocated in the area coverage element to the printing nozzles in the nozzle test chart by the computer.

SUMMARY OF THE INVENTION

An embodiment of the present invention that is describe herein provides a method for detecting a defective part (DP) in a digital printing system (DPS), the method includes receiving a first digital image (FDI) to be printed by the DPS. In a training phase: (i) for one or more first selected regions in the FDI, a first set of one or more synthetic images having a defect caused by the DP in the one or more first selected regions, is produced, and (ii) a neural network (NN) is trained to detect the defect using at least one of the synthetic images of the first set. In a detection phase that is subsequent to the training phase: (i) the trained NN is applied for identifying, in a second digital image (SDI) acquired from a printed image produced by the DPS, one or more second regions suspected of having the defect, (ii) for each of the second regions, a second set of one or more synthetic images having one or more DPs producing respectively one or more of the defects, is produced, and (iii) at least the DP is identified by comparing, in each of the second regions, between the SDI and the one or more synthetic images of the second set.

In some embodiments, the DPS include nozzles for directing a printing fluid onto a substrate, the DP includes a defective nozzle (DN) from among the nozzles, and the defect includes a missing nozzle fault (MNF) caused by a blocked orifice of the DN. In other embodiments, the method includes selecting, based on a predefined selection criterion, the first selected regions that include features for training the NN. In yet other embodiments, the NN includes a convolutional NN (CNN).

In an embodiment, the CNN has an inception-v3 architecture. In another embodiment, at least one of the FDI and SDI includes a product image. In yet another embodiment, the DPS include nozzles for directing a printing fluid onto a substrate, the DP includes a partially-clogged nozzle from among the nozzles, and the defect includes a registration error caused by the partially-clogged nozzle, which directs a printing fluid jetted at a deflected angle to land on a substrate at a distance from an intended landing position.

There is additionally provided, in accordance with an embodiment of the present invention, a system for detecting a defective part (DP) in a digital printing system (DPS), the system includes an interface and a processor. The interface is configured to receive: (i) a first digital image (FDI) to be printed by the DPS, and (ii) a second digital image (SDI) acquired from a printed image produced by the DPS. In a training phase, the processor is configured, to: (i) produce, for one or more first selected regions in the FDI, a first set of one or more synthetic images having a defect caused by the DP in the one or more first selected regions, and (ii) train a neural network (NN) to detect the defect using at least one of the synthetic images of the first set. In a detection phase that is subsequent to the training phase, the processor is configured, to: (i) apply the trained NN for identifying, in the SDI, one or more second regions suspected of having the defect, (ii) produce, for each of the second regions, a second set of one or more synthetic images having one or more DPs producing respectively one or more of the defects, and (iii) identify at least the DP by comparing, in each of the second regions, between the SDI and the one or more synthetic images of the second set.

The present invention will be more fully understood from the following detailed description of the embodiments thereof, taken together with the drawings in which:

DETAILED DESCRIPTION OF EMBODIMENTS

Overview

Digital printing systems comprise parts, such as nozzles, for jetting printing fluids onto a substrate, so as to produce an image thereon. In some cases, a nozzle may jet the printing fluid incorrectly, due to clogging or any other defect therein, resulting in forming a distortion in the printed image. In principle, it is possible to print a testing job for detecting a defective nozzle, but such testing jobs reduce the production time of the printing system, involve in redundant cost of printing consumables, and in waste production. Moreover, such testing jobs can be performed periodically, and therefore, cannot detect a defective nozzle in real time.

Embodiments of the present invention that are described hereinbelow provide methods and system for detecting, during production, a defective nozzle in a digital printing system (DPS) comprising an array of such nozzles.

In some embodiments, the DPS comprises a processor which is configured to detect the defective nozzle using a convolutional neural network (CNN) applied to a first digital image (FDI) to be printed by the DPS, and a second digital image (SDI) acquired from a printed image produced by the DPS. At least one the FDI and SDI is a product image printed during production, typically both.

In some embodiments, in a training phase of the CNN, the processor is configured to produce, for selected regions in the FDI, a first set of synthetic images (SIs), each SI is associated with a respective selected region and having a simulated missing nozzle fault (MNF) caused by a respective defective nozzle of the array. The processor is configured to train the CNN to detect the MNF using at least some of the SIs of the first set.

In some embodiments, in the detection phase that is subsequent to the training phase, the processor is configured to apply the trained CNN for identifying, in the SDI, one or more regions suspected of containing the MNF. Based on the printing plan of the SDI, the processor holds a list of nozzles participating in the printing of the suspected regions. The processor is configured to produce, for each of the suspected regions, a second set of SIs having one or more MNFs produced by one or more respective defective nozzles of the list.

In some embodiments, the processor is configured to identify at least the defective nozzle by comparing, in each of the suspected regions, between the SDI and the respective SIs of the second set.

The disclosed techniques improve the quality of printed digital images by real-time identification of defective nozzles, and thereby preventing MNFs in subsequent printed images. In the context of the present disclosure and in the claims, the term real-time identification refers to identifying defective nozzle by detecting the MNF immediately after being printed on the substrate. Moreover, by detecting MNFs and identifying defective nozzles during production, the disclosed techniques improve the utilization of a DPS for production, and reduce waste of substrates and printing fluids.

System Description

Figure 1:
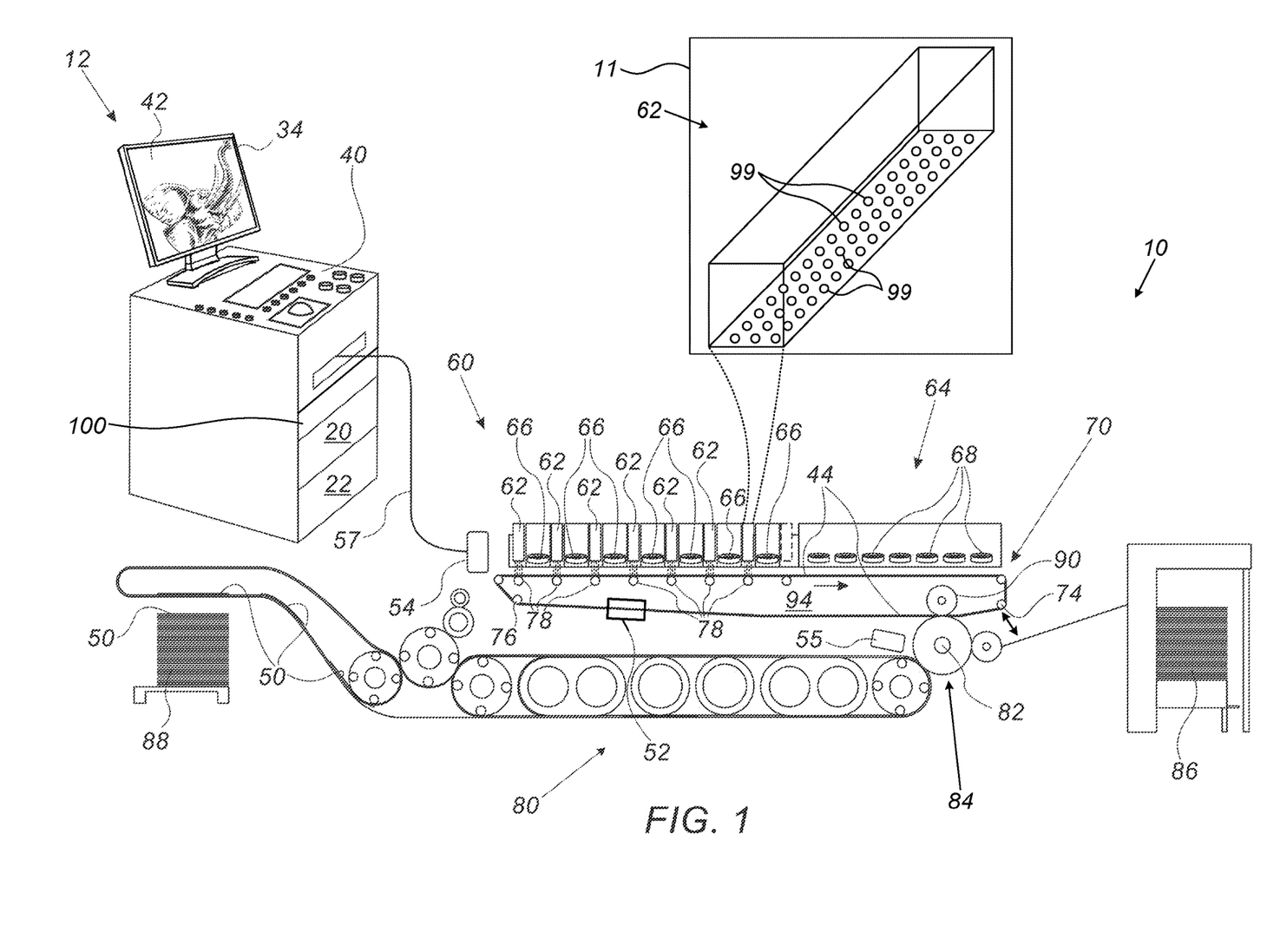
FIG. 1 is a schematic side view of a digital printing system, in accordance with an embodiment of the present invention.

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below. Moreover, embodiments of the present invention that are described below, are also applicable to printing systems using one or more drum as ITM, instead of or in addition to blanket 44.

In an operative mode, image forming station 60 is configured to form a mirror ink image, also referred to herein as "an ink image" (not shown) or as an "image" for brevity, of a digital image (DI) 42 on an upper run of a surface of blanket 44. Subsequently the ink image is transferred to a target substrate, (e.g., a paper, a folding carton, a multilayered polymer, or any suitable flexible package in a form of sheets or continuous web) located under a lower run of blanket 44.

In the context of the present invention, the term "run" refers to a length or segment of blanket 44 between any two given rollers over which blanket 44 is guided.

In some embodiments, during installation blanket 44 may be adhered edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44.

Reference is now made to an inset 11, showing print bar 62. In some embodiments, each print bar 62 comprises a strip of print heads (not shown) as wide as the printing area on blanket 44 and an array of individually controllable print nozzles 99, each of which configured to apply (e.g., by jetting and/or directing) a printing fluid toward a predefined position on blanket 44 that is moved by system 10.

Reference is now made back to the general view of FIG. 1. In some embodiments, image forming station 60 may comprise any suitable number of print bars 62, each print bar 62 may contain the printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan (C), magenta (M), yellow (Y) and black (K).

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis, also referred to herein as moving direction of blanket 44, represented by an arrow 94. In this configuration, accurate spacing between print bars 62, and synchronization between directing the droplets of the ink of each print bar 62 and moving blanket 44 are essential for enabling correct placement of the image pattern.

In the context of the present disclosure and in the claims, the terms "inter-color pattern placement," "pattern placement accuracy," "color-to-color registration," "C2C registration" "bar to bar registration," and "color registration" are used interchangeably and refer to any placement accuracy of two or more colors relative to one another.

In some embodiments, system 10 comprises heaters, such as hot gas or air blowers 66, which are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises drying station 64, configured to blow hot air (or another gas) onto the surface of blanket 44. In some embodiments, drying station comprises air blowers 68 or any other suitable drying apparatus. Additionally or alternatively, system 10 may comprise one or more illumination assemblies, which are configured to emit infrared (IR) radiation for drying the printing fluids (e.g., ink) applied to blanket 44. Such IR-emitting assemblies may be implemented, for example, in image forming station 60 (instead of or in addition to air blowers 66), and/or in drying station 64 (instead of or in addition to air blowers 68), and/or in other locations along blanket 44.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller. Note that in the context of the present invention and in the claims, the terms "indicative of" and "indication" are used interchangeably.

Additionally or alternatively, blanket 44 may comprise an integrated encoder (not shown) for controlling the operation of various modules of system 10. One implementation of the integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74.

In some embodiments, dancer assembly 74 may be motorized. The configuration and operation of rollers 76 and 78 are described in further detail, for example, in U.S. Patent Application Publication 2017/0008272 and in the above-mentioned PCT International Publication WO 2013/132424, whose disclosures are all incorporated herein by reference.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 are configured to receive the signals produced by the tension sensors, so as to monitor the tension applied to blanket 44 and to control the operation of dancer assembly 74.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises a processor 20, typically a general-purpose processor, with suitable front end and interface circuits for interfacing with controllers of dancer assembly 74 and with a controller 54, via a cable 57, and for receiving signals therefrom. Additionally or alternatively, console 12 may comprise any suitable type of an application-specific integrated circuit (ASIC) and/or a digital signal processor (DSP) and/or any other suitable sort of processing unit configured to carry out any sort of processing for data processed in system 10.

In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, console 12 comprises a digital front-end module (DFEM) 100, which is configured to carry out various computation processes of system 10. DFEM 100 may comprise one or more processing and memory devices such as but not limited to a Raster Image Processor (RIP) and interface circuits (not shown) for interfacing with processor 20 and/or with other components of system 10. In the configuration presented in FIG. 1, DFEM 100 is integrated into console 12 and interfaces with an operator (not shown) of system 10 using input devices 40 and display 34.

In other embodiments, DFEM 100 may comprise a stand-alone computer having input/output (I/O) devices for interfacing with the operator and with console 12. In alternative embodiments, DFEM 100 may have any other suitable configuration.

In some embodiments, processor 20 is configured to display on display 34, DI 42 comprising one or more segments (not shown) of DI 42 and/or various types of test patterns that may be stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52, the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket.

In some embodiments, blanket treatment station 52 may be positioned adjacent to image forming station 60, in addition to or instead of the position of blanket treatment station 52 shown in FIG. 1. In such embodiments, the blanket treatment station may comprise one or more bars, adjacent to print bars 62, and the treatment fluid is applied to blanket 44 by jetting.

In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied to blanket 44, by jetting, prior to the ink jetting at the image forming station.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively be mounted on a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders (not shown) so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

In some embodiments, system 10 comprises an image quality control station 55, also referred to herein as an automatic quality management (AQM) system, which serves as a closed loop inspection system integrated in system 10. In some embodiments, image quality control station 55 may be positioned adjacent to impression cylinder 82, as shown in FIG. 1, or at any other suitable location in system 10.

In some embodiments, image quality control station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width.

In the context of the present disclosure and in the claims, the terms "about" or "approximately" for any numerical values or ranges indicate a suitable dimensional tolerance that allows the part or collection of components to function for its intended purpose as described herein. For example, "about" or "approximately" may refer to the range of values ±20% of the recited value, e.g. "about 90%" may refer to the range of values from 72% to 100%.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with sheet 50, color-to-color (CTC) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, system 10 may print testing marks (not shown), for example at the bevels or margins of sheet 50. By acquiring images of the testing marks, station 55 is configured to measure various types of distortions, such as C2C registration error, image-to-substrate registration, different width between colors referred to herein as "bar to bar width delta" or as "color to color width difference", various types of local distortions, and front-to-back registration errors (in duplex printing). In some embodiments, processor 20 is configured to: (i) sort out, e.g., to a rejection tray (not shown), sheets 50 having a distortion above a first predefined set of thresholds, (ii) initiate corrective actions for sheets 50 having a distortion above a second, lower, predefined set of threshold, and (iii) output sheets 50 having minor distortions, e.g., below the second set of thresholds, to output stack 88.

In some embodiments, processor 20 is further configured to detect, e.g., by analyzing a pattern of the printed inspection marks, additional geometric distortion such as scaling up or down, skew, or a wave distortion formed in at least one of an axis parallel to and an axis orthogonal to the movement axis of blanket 44.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master. Processor 20 is further configured to classify the defects, and, based on the classification and predefined one or more criteria, to reject sheets 50 having defects that are not within the specified predefined criteria.

In some embodiments, system 10 comprises one or more suitable types of neural networks, which may be implemented in processor 20 and/or in DFEM 100 and/or in any other suitable processing device or module of system 10. One implementation of an exemplary sort of neural network is described in detail in FIG. 4 below, and methods for applying the neural network are described in detail in FIGS. 2A, 2B, 3 and 5 below.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Figure 2A:
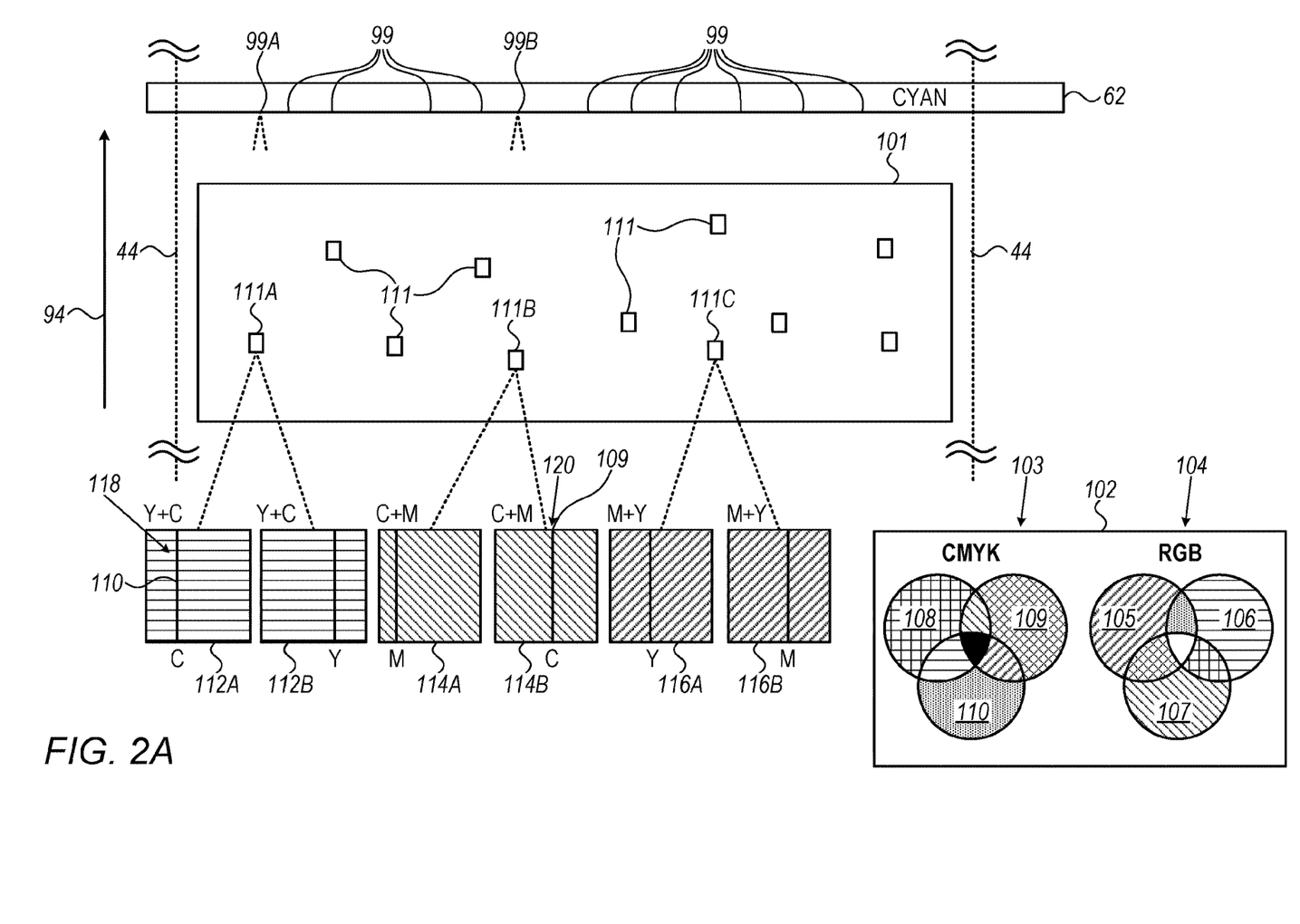
FIG. 2A is a schematic pictorial illustration showing a training phase of a convolutional neural network (CNN) configured to detect a missing nozzle fault (MNF), in accordance with an embodiment of the present invention.

Training Neural Network for Detecting Missing Nozzle Fault in Digital Printing FIG. 2A is a schematic pictorial illustration showing a training phase of a convolutional neural network (CNN) configured to detect a missing nozzle fault (MNF), in accordance with an embodiment of the present invention.

In some cases, a defective part (DP) in system 10 may cause a defect, such as a distortion, in a printed image. In the present example, a defective nozzle (DN) from among nozzles 99 may cause a missing nozzle fault (MNF) in the image formed on blanket 44, and therefore, typically on the corresponding sheet 50 (shown in FIG. 1 above) or on any other target substrate, as well as on blanket 44.

In some embodiments, as described in FIG. 5 below, a neural network (NN) may be used for detecting one or more MNFs and for identifying one or more DNs causing the MNFs. The method comprises two phases: (i) a training phase, in which the NN is trained using known input and output data, and (ii) a detection phase that is subsequent to and is based on the training phase. In the present example a CNN, whose structure is described in detail in FIG. 4 below, may be used for this task, however, any other suitable type of neural network may be used, mutatis mutandis, for detecting the MNF and for identifying the DN causing the MNF. Note that the architecture of the CNN was selected and optimized based on simulations and experiments carried out by the inventors.

In some embodiments, processor 20 is configured to receive, e.g., from the RIP of DFEM 100, a digital image, referred to herein as a RIP image or an image 101 produced on blanket 44 and transferred to sheet 50 as described in FIG. 1 above.

In the example of FIG. 2A, image 101 is formed on moving blanket 44, so that when blanket 44 passes below print bars 62, ink droplets of colors selected for image 101 (e.g., cyan, magenta, yellow and black, also referred to herein as CMYK for brevity) are directed by print bars 62 onto predefined regions 111 of blanket 44 so as to form image 101. As shown in FIG. 2A, when blanket 44 passes below a cyan print bar 62, the cyan ink is directed by nozzles 99A and 99B, onto predefined regions of blanket 44, referred to herein as patches 111A and 111B. The same process is carried out for the other print bars 62 (e.g., magenta (M) and yellow (Y) print bars 62).

In the context of the present disclosure and in the claims, the terms "region" and "patch" are used interchangeably and refer to a section on the digital image (e.g. image 101 or any other image described herein).

Reference is now made to an inset 102, showing an RGB (red, green, blue) palette 104 comprising a red color 105, a green color 106, a blue color 107, and combinations thereof. Also shown in inset 102, a CMYK palette 103 comprising a cyan ink (C) 108, a magenta ink (M) 109, a yellow ink (Y) 110 and combinations thereof. Note that CMYK palette 103 contains all the colors of RGB palette 104. Moreover, the term "K" in the CMYK palette refers to a black color formed when mixing the C, M and Y ink, as shown at the center of CMYK palette 103. For example, green color 106 is formed in the CMYK palette by mixing C 108 with Y 110, blue color 107 is formed in the CMYK palette by mixing C 108 with M 109, and red color 105 is formed in the CMYK palette by mixing M 109 with Y 110.

The following description of a method for producing a first set of one or more synthetic images (SIs) for training the CNN to detect MNFs, is implemented by processor 20. However, the method may be implemented, mutatis mutandis, using the RIP of DFEM 100 or any other suitable processing device or module of system 10, such as but not limited to a processor of quality control station 55.

In some embodiments, processor 20 is configured to produce (i) SIs 112A and 112B at patch 111A, (ii) SIs 114A and 114B at patch 111B, and (iii) SIs 116A and 116B at patch 111C. In some embodiments, processor 20 is configured to produce a synthetic MNF in each of the SIs. For example, when simulating a defective (e.g., blocked) nozzle 99A in SI 112A, cyan ink 108 is not applied to the substrate (e.g., blanket 44) at patch 111A, thus SI 112A has a column 118 having only yellow color Similarly, when simulating a blocked nozzle 99B in SI 114B, cyan ink 108 is not applied to blanket 44 at patch 111B, thus SI 114B has a column 120 having only magenta color. Note that the columns are produced when blanket 44 moves in the moving direction relative to print bars 62 and the column position within a given patch is derived from the position of the respective nozzle relative to the position of the given patch.

In some embodiments, processor 20 is configured to select the positions of patches 111 using any set of one or more predefined criteria. For example, each patch 111 may have 32 by 32 pixels, wherein at least a given amount (e.g., percent) of the pixels within the selected patch have a grey level smaller than 253 (in a 0-255 scale of gray levels). Note that the position of each patch 111 corresponds to one or more simulated defective (e.g., blocked) nozzles 99 intended to direct the ink onto the surface of blanket 44 at the position of the respective patch 111.

In some embodiments, a printed pixel size may be about 21 μm using a printing resolution of 1200 dots per inch (DPI), or any other suitable printing resolution. In such embodiments, a 32-by-32-pixel patch 111 may have a size of about 0.672 mm by 0.672 mm.

In some embodiments, processor 20 is configured to determine the number and positions of patches 111 distributed along and across image 101, based on any set predefined criteria. For example, processor 20 may determine about 5000 patches 111 distributed within image 101 for covering about 80% of the width of image 101, e.g., orthogonal to the moving direction of blanket 44, represented by arrow 94.

In some embodiments, processor 20 is configured to select patches 111 for training the CNN using any suitable criterion or set of criteria. For example, if, in patch 111A (i) an original synthetic image (e.g., without the simulated MNF), and (ii) SI 112A (having the simulated MNF), have at least ten pairs of pixels with a grey level difference larger than about 15 gray levels along the column of Y 110, then patch 111A can be used for training the CNN.

In some embodiments, the number of SIs is derived, inter alia, based on the number of patches and the average number of colors (e.g. RGB transformed into CMYK or any other suitable combination of ink colors). For example, each patch 111 may have three different colors in average, and therefore four SIs corresponding to a synthetic image for each CMYK color. In such example embodiments, for 5000 patches processor 20 produces about 20,000 SIs, and in case only 80% of the patches are qualified for training the CNN, processor 20 can use 16,000 SIs (such as SIs 112A-116B) for training the CNN to detect one or more MNFs.

In case 16,000 SIs are insufficient for obtaining the requested level of training, processor 20 may increase the number of patches 111 or select patches having more colors (and therefore more SIs).

Figure 2B:
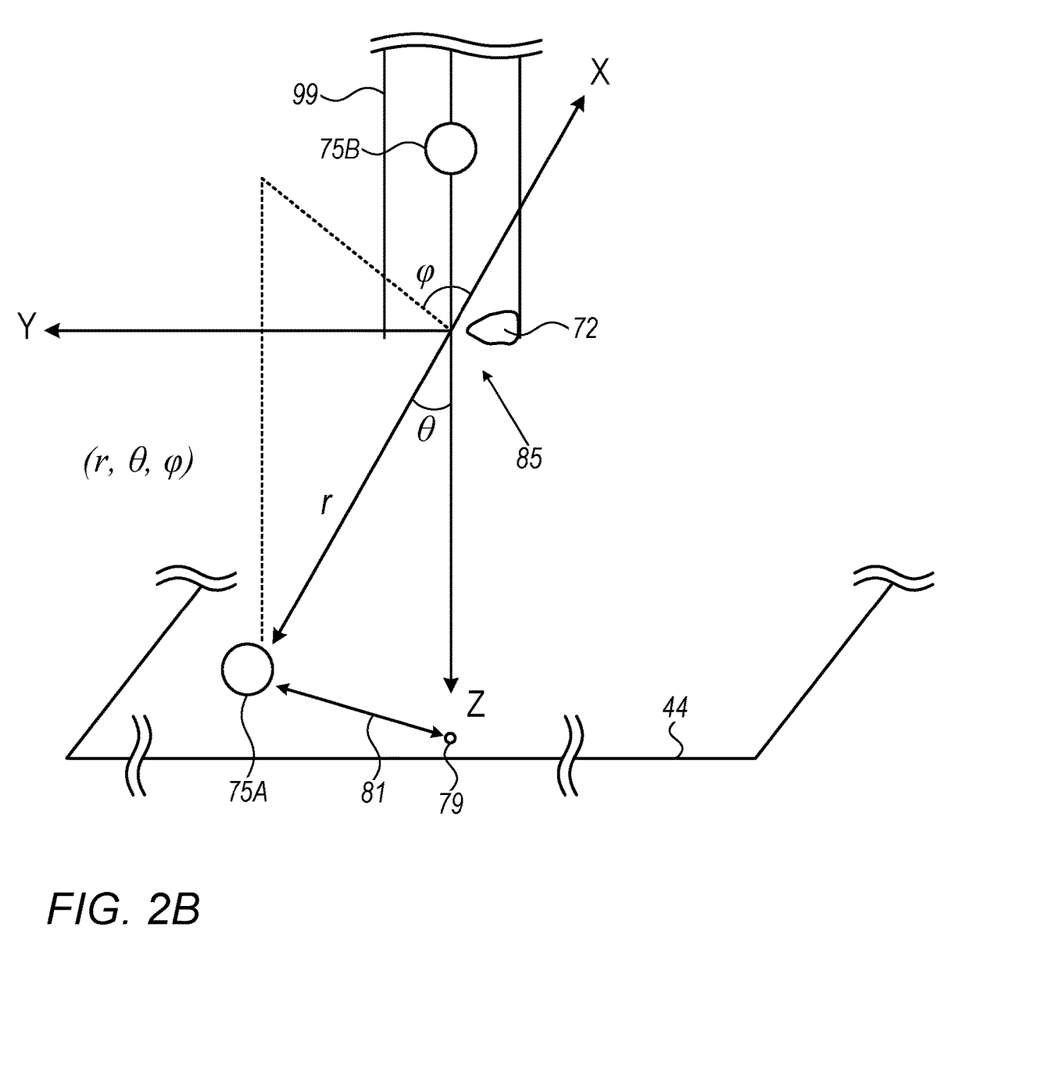
FIG. 2B is a schematic pictorial illustration showing the impact of a partially-clogged nozzle on image printing, and a training technique of the CNN for detecting the partially-clogged nozzle, in accordance with an embodiment of the present invention.

FIG. 2B is a schematic pictorial illustration showing the impact of a partially-clogged nozzle 99 on the printing, and a training technique of the CNN for detecting the partially-clogged nozzle, in accordance with an embodiment of the present invention.

In some embodiments, the technique described in FIG. 2A above may be used for training the CNN and for detecting additional faults, such as but not limited to a partially-clogged nozzle, which may occur in system 10.

In the example of FIG. 2B, after applying (e.g., jetting) droplets of ink from nozzles 99 of print bar 62 (shown in FIG. 1 above), residues of the ink may remain on the surface of a nozzle 99 and may coagulate to produce an undesired cluster 72 of dried ink. Cluster 72 may partially clog an orifice 85 of nozzle 99, which may result in a registration error in the printed image as will be described herein.

In some embodiments, nozzle 99 is configured to jet droplets 75A and 75B of ink, in the present example along a Z-axis of an XYZ coordinate system, toward an intended position 79 on the surface of blanket 44. In some case, the formation of cluster 72 may cause deflection in the steering angle of the droplets jetted toward blanket 44. As shown in the example of FIG. 2B, droplet 75A is deflected by cluster 72 and droplet 75B is expected to have a similar deflection while passing through orifice 85. Note that the deflection of the steering angle depends, inter alia, on the size and hardness of cluster 72, and on the position of cluster 72 on the surface of nozzle 99. The deflection in the steering angle causes droplet 75A to land on the surface of blanket 44 at a position located at a distance 81 from intended position 79. In other words, cluster 72 causes a registration error, which is measured by distance 81 between the intended and the actual landing positions of droplet 75A on the surface of blanket 44.

In the context of the present disclosure and in the claims, the terms "partially-clogged" and "partially-blocked" are used interchangeably and refer to a nozzle 99 having a cluster 72 that does not completely block orifice 85 of nozzle 99, but deflects droplets 75A and 75B as described above.

In some embodiments, during the training phase of the CNN, processor 20 is configured to select patches, such as patches 111 shown in FIG. 2A above, which are suitable for detecting a partially-clogged nozzle 99 in print bar 62. Moreover, processor 20 is configured to produce synthetic images indicative of the simulated landing position of the deflected ink droplet. For example, for partially-clogged nozzle 99, processor 20 is configured to produce a set of SIs in which the simulated landing position is determined in a spherical coordinate system comprising: (i) a radial distance of the landing position from the partially-clogged nozzle, also referred to herein as r, (ii) a polar angle measured from a fixed zenith direction (e.g., parallel to Z-axis and typically orthogonal to the surface of blanket 44) relative to orifice 85 of partially-clogged nozzle 99, also referred to herein as θ, and (iii) an azimuthal angle of its orthogonal projection on a reference plane that passes through the origin of the XYZ coordinate system, and is orthogonal to the zenith. The azimuthal angle is measured from a fixed reference direction on that plane, and is also referred to herein as φ.

In some embodiments, processor 20 is configured to estimate for each SI, a distance between the intended landing position of the ink droplet (i.e., without partial clogging), and the actual landing position of the droplet (due to the partial clogging). In the example of FIG. 2B, a distance 81 measured between intended position 79 and the actual landing position of droplet 75A. The intended and actual landing positions may be calculated in r,θ,φ coordinates of the spherical coordinate system, and may be used by processor 20 for estimating the size and orientation of distance 81.

In some embodiments, processor 20 is configured to select patches 111 for detecting partially-clogged nozzles 99 using any suitable one or more criteria, such as an irregular variance in the gray level within patches having an array of repetitive structures (e.g., a lattice of lines and spaces).

In some embodiments, processor 20 is configured to produce, for each selected patch 111, a set of synthetic images comprising the simulated landing position of the ink droplets deflected by the partially-clogged nozzle, based on the spherical coordinate system described above. The number of SIs depends, inter alia, on the number of discrete points selected within the spherical coordinate system, and may be limited to use-cases of interest and to meet the computational power constrains. For example, processor 20 may select the discrete points having a common radial distance estimated by the jetting force applied to droplet 75A and 75B, and a selected predefined number of polar angles and azimuthal angles.

Figure 3:
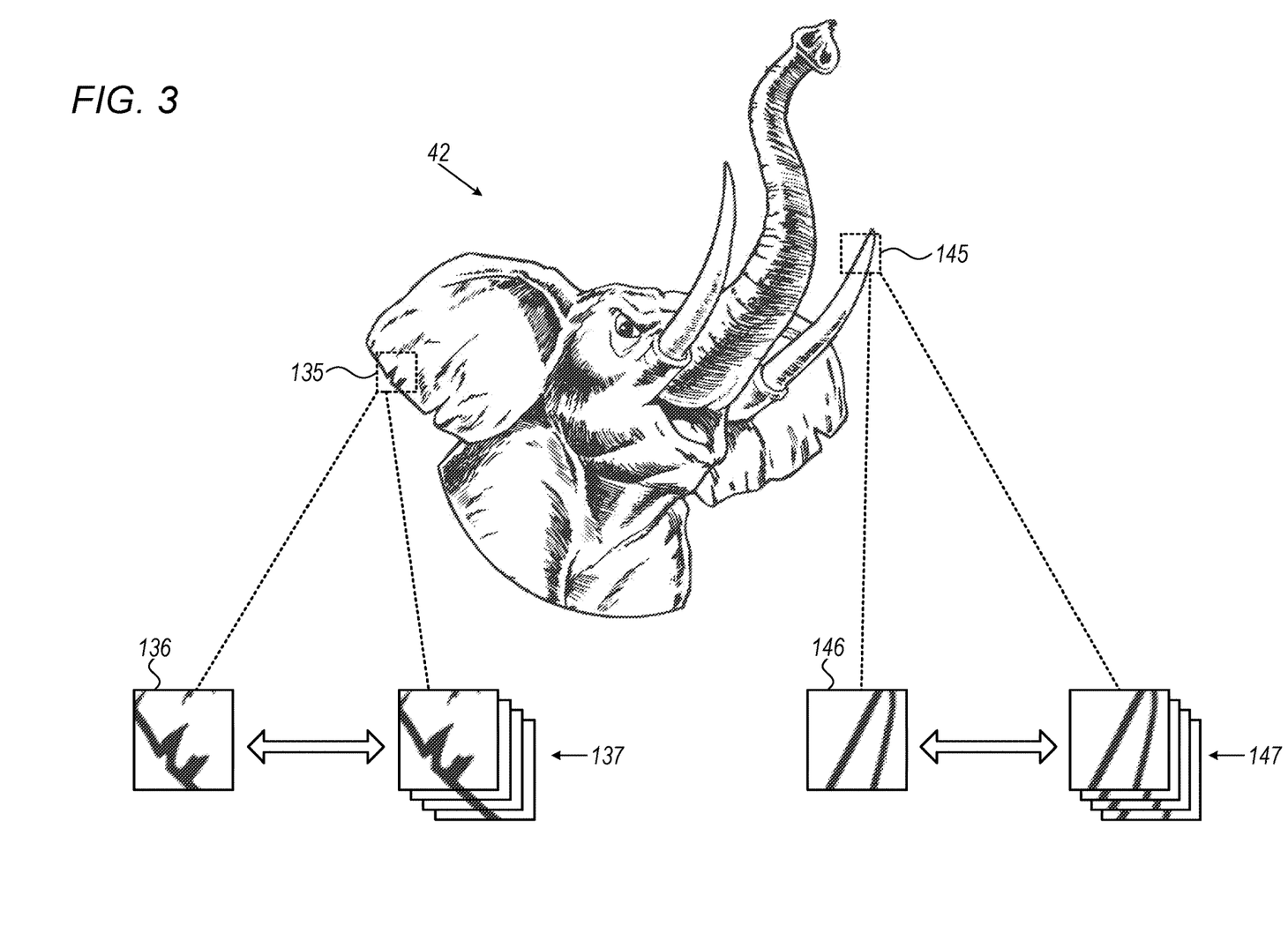
FIG. 3 is a schematic pictorial illustration showing a method for detecting a MNF using a trained CNN, in accordance with an embodiment of the present invention.

Detecting Missing Nozzle Faults and Identifying Defective Nozzles Using a Trained CNN FIG. 3 is a schematic pictorial illustration showing a method for detecting MNFs using a trained CNN, in accordance with an embodiment of the present invention. The embodiments below describe the method implementation using processor 20. However, the method may be implemented, mutatis mutandis, using DFEM 100 or a device thereof, or using any other suitable processing device or module of system 10.

In some embodiments, processor 20 receives DI 42, which is acquired by image quality control station 55, from a printed version of a digital image received from DFEM 100. Note that image 101 of FIG. 2A above has not been printed yet, and DI 42 is a digital image acquired from a printed image, and therefore may comprise one or more distortions and/or defects, such as one or more MNFs caused by one or more defective nozzles. Moreover, the CNN training described in FIG. 2A above, was carried out using image 101 of a first digital image, whereas DI 42 has a second digital image, which may be similar to or different from the first digital image. In other words, the CNN training may be carried out on a given digital image, and the detection of one or more MNFs and DNs described herein may be carried out on a digital image acquired from a printed version of the given digital image, or from a printed version of a different image. For example, image 101 may comprise a digital image of a dog (not shown) and DI 42 may comprise the same dog image (with or without defects caused during the printing process), or from a printed version of a digital image of an elephant, as shown in DI 42 of FIGS. 1 and 2 above.

In some embodiments, processor 20 is configured to apply the training dataset shown in FIG. 2A above (and/or the training dataset described in FIG. 2B above) to a suitable CNN architecture for identifying, in DI 42, one or more regions (e.g., regions 135 and 145) suspected of having a defect (e.g., the MNF and/or the C2C registration error cause by partially-clogged nozzle 99) that the CNN was trained to detect, as described in FIG. 2A above.

Note that by detecting potential MNFs in regions 135 and 145, the trained CNN reduces the number of suspected defective nozzles 99 in system 10. Therefore, region 135 comprises a known set of color pixels printed by known nozzles 99 of known print bars 62 of image forming station 60 of system 10.

In the example of FIG. 3, a DI 136 shows a higher magnification of a section of the elephant ear shown in region 135 of DI 42. In some embodiments, processor 20 is configured to produce, for region 135, a set of one or more synthetic images, referred to herein as a set 137. Each SI of set 137 comprises a simulation of one or more defective nozzles 99 selected from the known print bars 62 and nozzles 99 used for applying the one or more colors of ink to region 135.

In some embodiments, the SIs of set 137 comprise all combinations of nozzles 99 of print bars 62 participating in the formation of DI 136.

For example, DI 136 may be formed using four nozzles 99 of cyan print bar 62, five nozzles 99 of magenta print bar 62, and three nozzles 99 of yellow print bar 62. Therefore, set 137 may comprise up to (4·5·3=) 60 SIs, one SI for each nozzle 99. In some embodiments, the number of nozzles suspected of having a defect, and therefore, the number of SIs of set 137, may be reduced. For example, in case the MNF is visible and appears to happen in a specific color, e.g., cyan. In this example, set 137 may comprise only four SIs, each SI simulates one suspected defective nozzle 99 of cyan print bar 62.

In some embodiments, processor 20 is configured to identify at least one defective nozzle 99 from among the nozzles participating in the formation of region 135. In an embodiment, processor 20 is configured to compare between DI 136 and each SI of set 137. The comparison may be carried out using the trained CNN or using any other suitable image comparison technique.

In some embodiments, by comparing between DI 136 of region 135, and each SI of set 137, processor 20 is configured to: (i) identify one or more MNFs in suspected region 135, and (ii) associate each MNF with one or more respective defective nozzles 99 from among the nozzles participating in the formation of region 135.

A process for detecting a defective nozzle, based on the embodiments described in one or more of FIGS. 2A, 2B and 3 above, may be summarized using the following example. In the example, nozzle 99A (shown in FIG. 2A above) of cyan print bar 62 may be defective, e.g., blocked, and therefore cannot apply droplets of cyan ink to blanket 44 in region 135 of DI 42. During the training phase shown and described in FIG. 2A above, processor 20 is configured to produce SI 112A, showing a simulation of blocked nozzle 99A in patch 111A. The CNN is trained, based on SI 112A and other SIs of FIG. 2A above, to detect, in digital images printed by system 10, regions suspected for having one or more MNFs caused by one or more respective defective nozzles 99. In a detection phase (shown in FIG. 3) that is subsequent to the training phase, the trained CNN is configured to detect in DI 42, region 135 printed using nozzle 99A and additional nozzles 99, wherein at least one of these nozzles is suspected for being a defective nozzle.

In some embodiments, processor 20 is configured to produce in set 137, an SI for simulating a respective nozzle 99, which is associated with region 135 and is suspected for being defective, as described above.

In some embodiments, processor 20 is configured to compare between DI 136 and each SI of set 137, and to detect blocked nozzle 99A, by finding correlation between DI 136 and the SI of set 137, simulating the MNF caused by blocked nozzle 99A.

Similarly, a DI 146 shows a higher magnification of a section of a tip of the elephant task shown in region 145 of DI 42. In some embodiments, processor 20 is configured to produce, for region 145, a set of one or more synthetic images, referred to herein as a set 147. Each SI of set 147 comprises a simulation of one or more defective nozzles 99 selected from the known print bars 62 and nozzles 99 used for applying the one or more colors of ink to suspected region 145. Processor 20 is configured to apply the process described above for region 135, so as to (i) detect one or more MNFs in region 145, and (ii) identify, within one or more respective print bars 62 of system 10, one or more defective nozzles 99 causing the detected MNFs.

In other embodiments, processor 20 is configured to apply the techniques described in FIG. 2A above to the trained CNN for detecting regions that are suspected of having partially-clogged nozzles 99. It will be understood by a person skilled in the art of digital printing that typically a similar mechanism may cause a partially-clogged nozzle and a fully-blocked nozzle. Thus, in some cases a given print bar 62 may cause both the MNF defect and the registration error depicted above in FIGS. 2A and 2B, respectively. In the present example, the CNN may output that region 145 is suspected for comprising a registration error that may be caused by cluster 72 that partially-blocks orifice 85 of nozzle 99, as shown and described in detail in FIG. 2B above.

In some embodiments, processor 20 receives, e.g., from image quality control station 55, DI 146 showing a higher magnification of the aforementioned section of the tip of the elephant task shown in region 145 of DI 42.

In some embodiments, processor 20 is configured to produce, for region 145, in addition to or instead of set 147, a supplementary set of one or more synthetic images. Each SI of the supplementary set comprises a simulation of one or more registration errors caused by deflected droplets jetted by a suspected partially-clogged nozzles 99, which are intended for applying the droplets of one or more colors of ink to suspected region 145.

In some embodiments, processor 20 is configured to apply the process described above for detecting the MNF defects in regions 135 and 145, so as to (i) detect one or more registration errors in region 145, and (ii) identify, within one or more respective print bars 62 of system 10, one or more partially-clogged nozzles 99 that jet deflected droplets (such as droplet 75A of FIG. 2B above) causing the detected registration error.

In the present example, the deflection of droplets may occur in specific nozzles 99 of a cyan print bar 62 (shown in FIG. 2A above), which are intended to apply droplets of cyan ink to predefined sections of blanket 44. Therefore, the aforementioned partially-clogged nozzles 99 may cause a C2C registration error between the cyan color and the other colors applied to these predefined sections.

In other embodiments, processor 20 is configured to use the CNN for detecting suspected regions 135 and 145, e.g., by applying the technique described in FIG. 2A above. Subsequently, at the detection phase shown in FIG. 3, processor 20 is configured to apply the technique depicted in FIG. 2B above, for detecting within regions 135 and 145, defects indicative of one or more partially-clogged nozzles 99. In such embodiments, processor 20 may apply the CNN for producing SIs indicative of simulated partially-clogged nozzles, only to regions 135 and 145.

FIGS. 2A, 2B and 3 illustrate, by way of example, a method for identifying defective nozzles 99 (e.g., fully blocked or partially clogged) in print bars 62 of system 10. The techniques described herein, however, can be used, mutatis mutandis, for identifying other defective parts of system 10 or in any other suitable technique involving identifying one or more defective parts in any sort of system, used for printing or for any other sorts of production processes.

Figure 4:
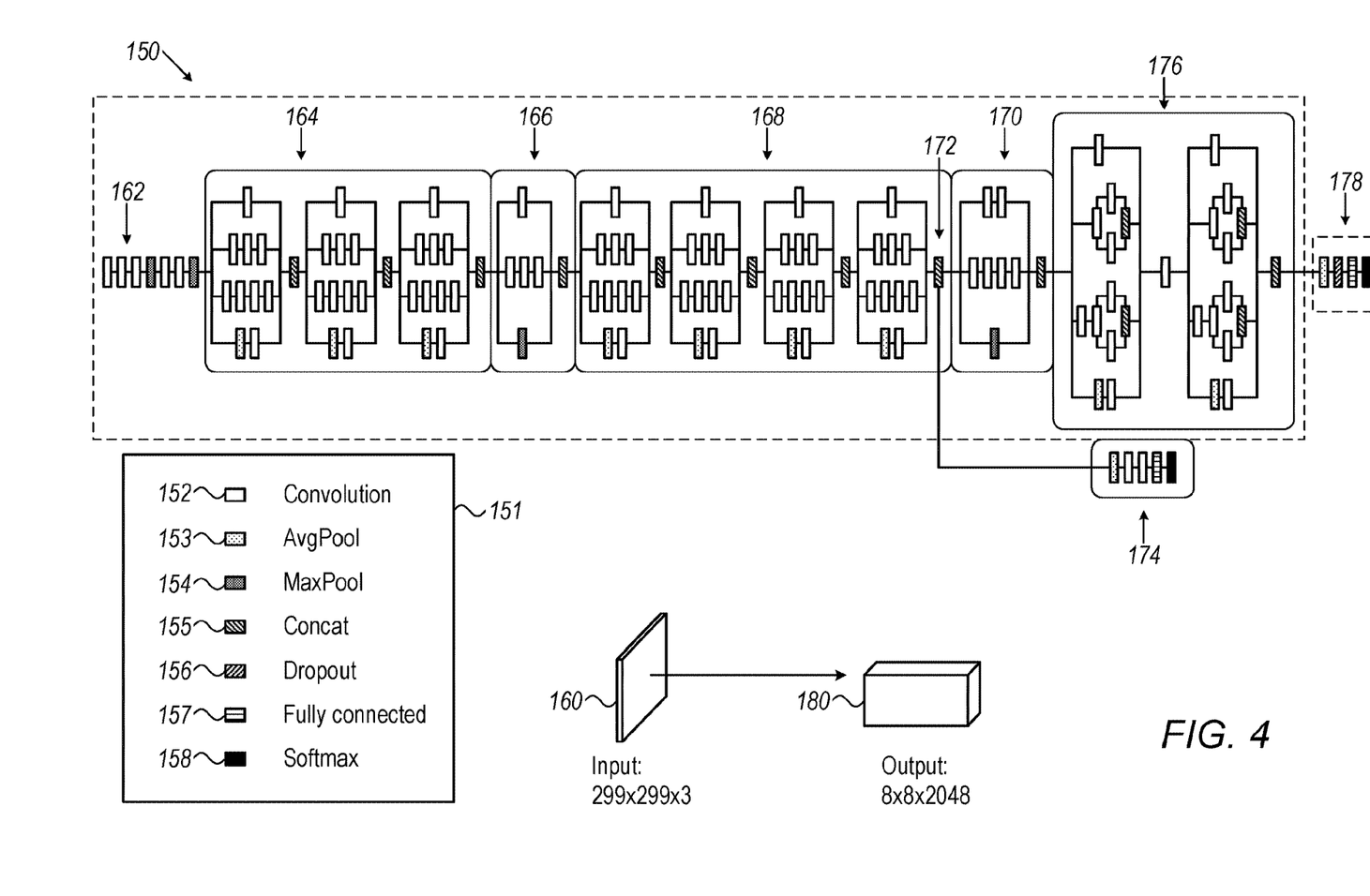
FIG. 4 is a schematic pictorial illustration of a CNN used for detecting a MNF in a printed image, in accordance with an embodiment of the present invention.

FIG. 4 is a schematic pictorial illustration of a convolutional neural network (CNN) 150 used for detecting MNFs in DI 42, in accordance with an embodiment of the present invention. In some embodiments, the elements of CNN 150 may be implemented in hardware or software, or using in any suitable combination thereof.

In some embodiments, processor 20 is configured to train CNN 150 for detecting one or more MNFs in DI 42. Processor 20 is further configured to use the one or more detected MNFs for identifying defective nozzles 99 (and/or other parts) of system 10, as described in FIGS. 2A, 2B and 3 above, and using a method that will be described in FIG. 5 below.

In some embodiments, CNN 150 has an inception-v3 architecture provided by Google (Mountain View, Calif. 94043), but may have any other suitable type of neural network.

In some embodiments, CNN 150 may comprise multiple sections and modules described below.

In some embodiments, CNN 150 may comprise (e.g., in the aforementioned modules) a multi-layered convolutional neural network, each of the layers having an array of neurons.

In some embodiments, each neuron in CNN 150 computes an output value by applying a specific function to the input values coming from the receptive field in the previous layer. The function that is applied to the input values is determined by a vector of weights and a bias (typically real numbers). The learning process in CNN 150, progresses by making iterative adjustments to these biases and weights.

The vector of weights and the bias are referred to herein as filters of the layers and are defined by a particular size and shape of the input (e.g., a particular shape). A distinguishing feature of CNNs is that many neurons can share the same filter.

In some embodiments, CNN 150 is configured to receive an input 160 comprising an array of 299 by 299 by 3 weights, corresponding to the 299 by 299 pixels of a respective digital image, each of the pixels having three colors (e.g., RGB as described in FIGS. 2A and 3 above).

Reference is now made to an inset 151 showing a legend of layers and other elements used in the architecture of CNN 150. In some embodiments, CNN 150 comprises convolutional layers, labeled in inset 151 as "convolution," and referred to herein as CLs 152. CNN comprises average pooling layers 153, labeled in inset 151 as "AvgPool," and max pooling layers 154, labeled in inset 151 as "MaxPool." Pooling layers are configured to reduce the dimensions of the data by combining the outputs of neuron clusters at one layer into a single neuron in the next layer.

The term "Max pooling" refers to pooling that uses the maximum value from each of a cluster of neurons at the prior layer. The average pooling uses the average value from each of a cluster of neurons at the prior layer, so that average pooling is configured to convert the output tensor of a convolutional layer to a vector of weights having, for example, any suitable number of scalar numbers. In the context of the present invention and in neural networks, the term "flatten" refers to conversion of a multi-dimensional tensor into a one-dimensional vector.

In some embodiments, CNN 150 comprises multiple concatenations, configured to concatenate between adjacent layers and/or module and/or sections of CNN 150. Each of the concatenations is labeled in inset 151 as "concat" and is referred to herein as a concat 155.

In some embodiments, CNN 150 comprises one or more dropout layers, referred to herein as a dropout 156, which may be used at multiple layers as will be described herein. A softmax activation function may be used in one or more layers (e.g., in a classifier layer described below), and is referred to herein as a softmax 158. The dropout layer and softmax activation function are labeled in inset 151 as "Dropout" and "Softmax," respectively.

In some embodiments, CNN 150 comprises one or more fully-connected layers (FCL) 157, labeled in inset 151 as "Fully connected." Note that term "fully connected layer" refers to a neural network layer that connects every neuron in one layer to every neuron in another layer.

Reference is now made back to the general view of FIG. 4. In some embodiments, CNN 150 comprises a module 162 having multiple CLs 152 and max pooling layers 154 arranged sequentially. Module 162 is configured to receive input 160 and to prepare the weights of input to be inserted into a module 164, also referred to herein as a "5X Inception Module A" comprising multiple CLs 152 and average pooling layers 153 arranged in suitable structures and having concats 155 for concatenating between the structures of layers.

In some embodiments, CNN 150 comprises a grid size reduction module 166, which is configured to convert the array of 299 by 299 by 3 weights of input 160, to an output array of 8 by 8 by 2048 weights, referred to herein as an output 180. In the present example, grid size reduction module 166 comprises multiple CLs 152, a max pooling layer 154, and a concat 155.

In other embodiments, module 166 may have a different structure than the structure shown in FIG. 4.

In some embodiments, CNN 150 comprises a module 168, also referred to herein as a "4X Inception Module B" comprising multiple CLs 152 and average pooling layers 153 arranged in suitable structures and having concats 155 for concatenating between the structures of layers.

In some embodiments, CNN 150 comprises an auxiliary classifier 174, which is coupled to a concat 172, which is the right-most concat of module 168. Auxiliary classifier 174 comprises multiple layers, such as one average pooling layer 153, two CLs 152, one FCL 157 and one softmax 158.

In some embodiments, CNN 150 comprises a grid size reduction module 170 comprising multiple CLs 152, a max pooling layer 154, and a concat 155. In some embodiments, CNN 150 comprises a module 176, also referred to herein as a "2X Inception Module C" comprising multiple CLs 152 and average pooling layers 153 arranged in suitable structures and having concats 155 for concatenating between the structures of layers.

In some embodiments, CNN 150 comprises a tensor 178, comprising multiple layers, such as one average pooling layer 153, one dropout 156, one FCL 157 and one softmax 158. Tensor 178, which is the output of CNN 150, has the structure described above for output 180 (an array of 8 by 8 by 2048 weights).

The configuration of the inception-v3 CNN architecture and particularly that of CNN 150, and use cases thereof are described in detail, for example by Szegedy et al., in "Rethinking the Inception Architecture for Computer Vision," computer vision and pattern recognition (CVPR) conference of the Computer Vision Foundation (CVF) pages 2818-2826 (June 2016); and by Sik-Ho Tsang, in "Review: Inception-v3—1st Runner Up (Image Classification) in ILSVRC 2015," (Sep. 10, 2018), which are all incorporated herein by reference.

This particular configuration of CNN 150 is shown by way of example, in order to illustrate certain problems that are addressed by embodiments of the present invention and to demonstrate the application of these embodiments in enhancing the performance of system 10 using CNN 150. Embodiments of the present invention, however, are by no means limited to this specific sort of example CNN configuration, and the principles described herein may similarly be applied to other sorts of neural networks used for enhancing the performance of such digital printing systems.

Figure 5:
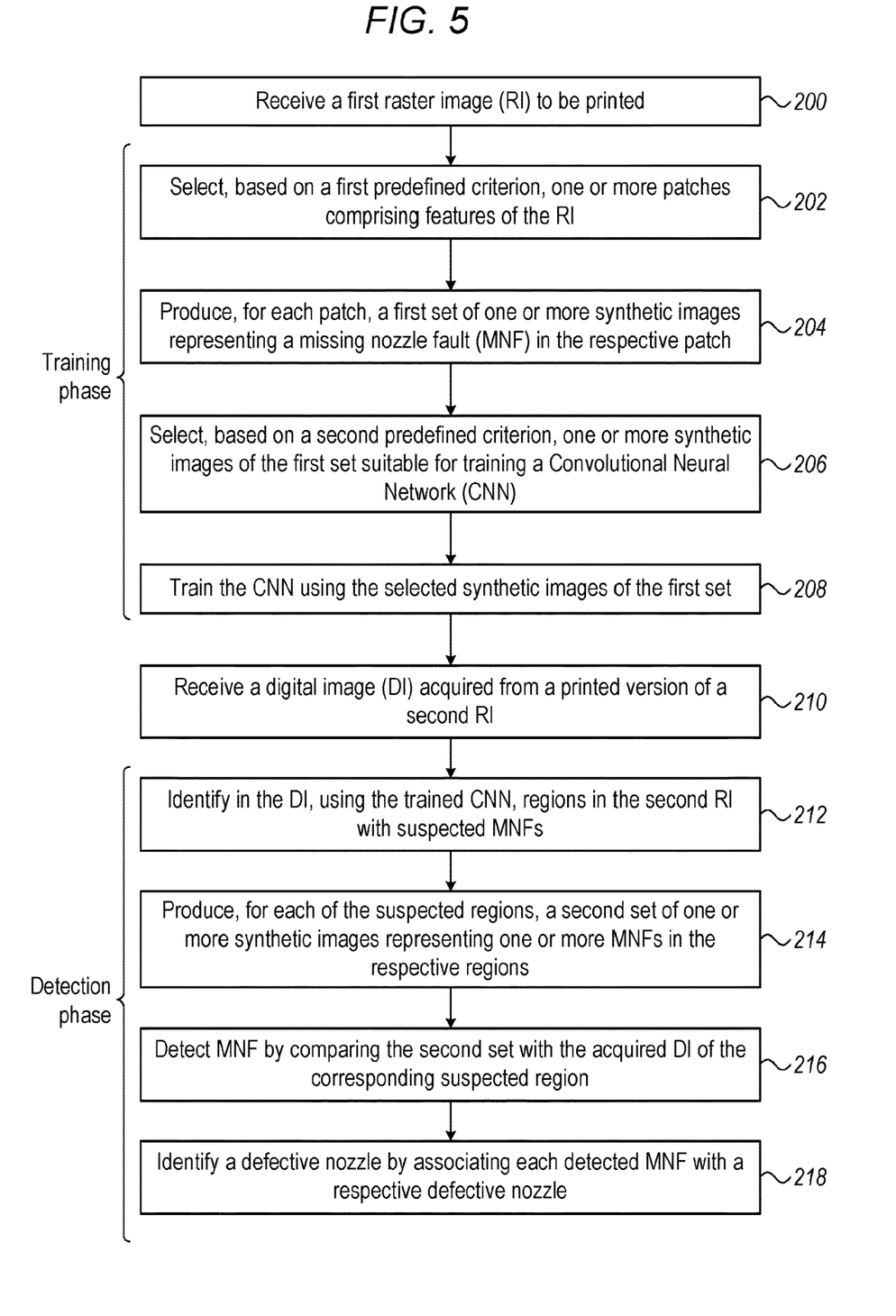
FIG. 5 is a flow chart that schematically illustrates a method for detecting a defective nozzle in a digital printing system, using a CNN, in accordance with an embodiment of the present invention.

FIG. 5 is a flow chart that schematically illustrates a method for detecting a defective nozzle in system 10, in accordance with an embodiment of the present invention. The method may be implemented, as described below, using processor 20. However, the method may be implemented, mutatis mutandis, using DFEM 100 or a device thereof, or using any other suitable processing device or module of system 10.

The method begins at a first raster image receiving step 200, with processor 20 receiving image 101, e.g., from the RIP of DFEM 100, as described in FIG. 2A above. After concluding step 200, the method has two phases: a training phase, and a detection phase that is subsequent to the training phase.

The detection phase begins at a patch selection step 202, with processor 20 selecting, based on a predefined criterion, one or more (e.g., about 5000) patches (e.g., patches 111, 111A, 111B and 111C) comprising features of image 101, as described in FIG. 2A above.

At a first synthetic images (SIs) production step 204, processor 20 produces, for each patch produced in step 202, a first set of one or more synthetic images (e.g., SIs 112A, 112B, 114A, 114B, 116A and 116B of FIG. 2A above) having a simulated missing nozzle fault (MNF) in the respective patch (e.g., patches 111A, 111B and 111C), as described in FIG. 2A above. Additionally or alternatively, processor 20 produces, for each patch produced in step 202, a first additional set of one or more synthetic images having a simulated registration error that may be caused (by partially-clogged nozzles 99) in one or more respective patches 111, as described in FIG. 2B above.

At a SI selection step 206, processor 20 selects, based on a second predefined criterion, one or more of the SIs of the first set (and/or the first additional set) produced in step 204 above. The selected SIs are suitable for training a convolutional neural network (CNN), such as CNN 150, as described in FIGS. 2A and 2B above.

At a CNN training step 208, processor 20 trains CNN 150 using the synthetic images of the first set (and/or the first additional set) selected in step 206, as described in FIGS. 2A and 2B above. Step 208 concludes the training phase and thereafter CNN 150 is trained for detecting defects, such as MNFs and/or registration errors, in images printed by system 10.

At a digital image receiving step 210, processor 20 receives, e.g., from image quality control station 55, a digital image acquired from an image printed by system 10. In some embodiments, processor produces DI 42 based on the image received from image quality control station 55. In other embodiments, processor 20 receives DI 42, which is produced by image quality control station 55.

After concluding step 210, the method begins the detection phase at a regions identification step 212, with processor 20 applying CNN 150 for identifying, in DI 42, regions 135 and 145 suspected for having MNFs and/or registration errors, as described in detail in FIG. 3 above.

At a second SIs production step 214, processor 20 produces, for each of regions 135 and 145 detected in step 212, a second set of one or more synthetic images (e.g., sets 137 and 147 of FIG. 3 above) having a simulated missing nozzle fault (MNF) and/or registration errors in the respective regions (e.g., regions 135 and 145). As described in FIG. 3 above, the number of SIs in sets 137 and 147 corresponds to the number of nozzles 99 participating in the image forming at regions 135 and 145. For example, set 137 may comprise up to 60 SIs for simulating, respectively, a defect in each of the 60 nozzles 99 used by system 10 in the image formation of region 135. In other words, each SI of set 137 has one simulated defective nozzle 99, so as to incorporate all nozzles 99 used for applying ink to region 135 of DI 42.

At a MNF detection step 216, processor 20 detects one or more MNFs by comparing the second set of SIs (e.g., set 137) with the acquired DI (e.g., DI 136) of the corresponding suspected region (e.g., region 135). In other embodiments, in step 216 processor 20 may detect (in addition to or instead of the MNFs) one or more C2C registration errors by comparing the second set of SIs (e.g., the supplementary set of one or more synthetic images described in FIG. 3 above) with the acquired DI (e.g., DI 146) of the corresponding suspected region (e.g., region 145). Note that processor 20 may: (i) use the training phase for training the CNN to detect both the MNF and the C2C registration error (caused by partially-clogged nozzle(s) 99), (ii) apply the CNN to detect regions suspected of having the MNF (e.g., regions 135 and 145), and (iii) apply the trained CNN to the suspected regions for detecting both the MNF and the C2C registration error.

At a defective nozzle identification step 218, which concludes the detection phase and terminates the method, processor 20 identifies one or more defective nozzles 99, by associating each MNF detected in step 216, with a respective defective nozzle 99 of system 10. As described in FIG. 3 above, processor 20 may compare between DI 136 and each SI of set 137, so as to detect a defective nozzle (such as blocked nozzle 99A), by finding correlation between DI 136 and the corresponding SI of set 137, which is simulating the MNF caused by the defective nozzle (e.g., blocked nozzle 99A). Additionally or alternatively, at step 218, processor 20 identifies one or more partially-clogged nozzles 99, by associating each C2C registration error detected in step 216, with a respective partially-clogged nozzle 99 of system 10.

In some embodiments, processor 20 may apply the trained CNN, only to regions 135 and 145 that were detected based on the MNF training of the CNN, for detecting the C2C registration error (as described in step 216 above) and for identifying one or more partially-clogged nozzles 99 (as described above in step 218).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for detecting a defective part (DP) in a digital printing system (DPS), the method comprising:
   receiving a first digital image (FDI) to be printed by the DPS;
   in a training phase:
      producing, for one or more first selected regions in the FDI, a first set of one or more synthetic images having a defect caused by the DP in the one or more first selected regions;
      selecting, based on a predefined selection criterion, the first selected regions that comprise features for training a neural network (NN); and
      training the NN to detect the defect using at least one of the synthetic images of the first set; and
   in a detection phase that is subsequent to the training phase:
      applying the trained NN for identifying, in a second digital image (SDI) acquired from a printed image produced by the DPS, one or more second regions suspected of having the defect;
      producing, for each of the second regions, a second set of one or more synthetic images having one or more DPs producing respectively one or more of the defects; and
      identifying at least the DP by comparing, in each of the second regions, between the SDI and the one or more synthetic images of the second set.

2. The method according to claim 1, wherein the NN comprises a convolutional NN (CNN).

3. The method according to claim 2, wherein the CNN has an inception-v3 architecture.

4. The method according to claim 1, wherein at least one of the FDI and SDI comprises a product image.

5. The method according to claim 1, wherein the DPS comprise nozzles for directing a printing fluid onto a substrate, wherein the DP comprises a defective nozzle (DN) from among the nozzles, and wherein the defect comprises a missing nozzle fault (MNF) caused by a blocked orifice of the DN.

6. The method according to claim 1, wherein the DPS comprise nozzles for directing a printing fluid onto a substrate, wherein the DP comprises a partially-clogged nozzle from among the nozzles, and wherein the defect comprises a registration error caused by the partially-clogged nozzle, which directs a printing fluid jetted at a deflected angle to land on a substrate at a distance from an intended landing position.

7. A system for detecting a defective part (DP) in a digital printing system (DPS), the system comprising:
   an interface, which is configured to receive: (i) a first digital image (FDI) to be printed by the DPS, and (ii) a second digital image (SDI) acquired from a printed image produced by the DPS; and
   a processor, wherein
      in a training phase, the processor is configured, to: (i) produce, for one or more first selected regions in the FDI, a first set of one or more synthetic images having a defect caused by the DP in the one or more first selected regions, (ii) select, based on a predefined selection criterion, the first selected regions that comprise features for training a neural network (NN), and (iii) train the NN to detect the defect using at least one of the synthetic images of the first set; and
      in a detection phase that is subsequent to the training phase, the processor is configured, to: (i) apply the trained NN for identifying, in the SDI, one or more second regions suspected of having the defect, (ii) produce, for each of the second regions, a second set of one or more synthetic images having one or more DPs producing respectively one or more of the defects, and (iii) identify at least the DP by comparing, in each of the second regions, between the SDI and the one or more synthetic images of the second set.

8. The system according to claim 7, wherein the NN comprises a convolutional NN (CNN).

9. The system according to claim 8, wherein the CNN has an inception-v3 architecture.

10. The system according to claim 7, wherein at least one of the FDI and SDI comprises a product image.

11. The system according to claim 7, wherein the DPS comprise nozzles for directing a printing fluid onto a substrate, wherein the DP comprises a defective nozzle (DN) from among the nozzles, and wherein the defect detected by the NN comprises a missing nozzle fault (MNF) caused by a blocked orifice of the DN.

12. The system according to claim 7, wherein the DPS comprise nozzles for directing a printing fluid onto a substrate, wherein the DP comprises a partially-clogged nozzle from among the nozzles, and wherein the defect comprises a registration error caused by the partially-clogged nozzle, which directs a printing fluid jetted at a deflected angle to land on a substrate at a distance from an intended landing position.

* * * * *